United States Patent [19]

Aoki

[11] Patent Number: 4,507,258
[45] Date of Patent: Mar. 26, 1985

[54] METHOD FOR INJECTION MOLDING A COMPOSITE PARISON

[76] Inventor: Katashi Aoki, 6037 Ohazaminamijo, Sakaki-machi, Hanishina-gun, Nagano-ken, Japan

[21] Appl. No.: 526,789

[22] Filed: Aug. 26, 1983

[30] Foreign Application Priority Data

Aug. 31, 1982 [JP] Japan ................. 57-151174

[51] Int. Cl.³ .............................. B29C 17/07
[52] U.S. Cl. ................... 264/255; 264/513; 264/247; 264/250; 264/267; 425/523; 425/533
[58] Field of Search ............. 425/523, 130, 129 R, 425/533; 264/513, 245, 246, 247, 250, 255, 259, 267

[56] References Cited

U.S. PATENT DOCUMENTS

| | | | |
|---|---|---|---|
| 2,607,957 | 8/1952 | Danielson et al. | 264/247 |
| 3,086,249 | 4/1963 | Nelson et al. | 264/513 |
| 3,914,081 | 10/1975 | Aoki | 425/130 |
| 4,321,089 | 3/1982 | Aoki | 425/523 |

Primary Examiner—Jan Silbaugh
Assistant Examiner—Hubert C. Lorin
Attorney, Agent, or Firm—Louis Weinstein

[57] ABSTRACT

The invention discloses a method for injection molding a composite parison comprising the following first and second steps:

a first step wherein neck molds mounted on a transport plate and a mold for a parison neck or an outer layer of the neck are brought together at a first molding station and molten resin is injected into a cavity formed in the neck mold to mold the outer layer of the neck of the parison, and a second step wherein said outer layer of the neck together with the neck molds are transported to a second molding station, the neck molds, the mold for the main parison portion and core molds are brought together at said second molding station while holding the outer layer of the neck to form continuous cavities extending over the inside of the outer layer of the neck, and molten resin different from the first mentioned molten resin is injected into said cavity to mold the main parison and at the same time mold an inner layer of a neck which is integral with said main parison portion and deposited with the outer layer of the neck to form a composite.

4 Claims, 5 Drawing Figures

METHOD FOR INJECTION MOLDING A COMPOSITE PARISON

BACKGROUND OF THE INVENTION

In bottles of polyethylene terephthalate manufactured by stretching blow molding, when the bottle is filled with contents at a high temperature, a lip portion of the bottle often becomes deformed. It is said that such a deformation results from the fact that a parison is subjected to stretching blow molding under the condition that a neck of the parison being injection molded is held, and therefore, the parison neck is not stretched but remains injection molded, the parison neck being deformed due to heating.

In view of the foregoing, an attempt has been made by the present inventor to mold a neck of a parison using a resin having a heat resistance, for example, such as polycarbonate, in order to impart thermal stability to a lip portion of the bottle. A molding method in this case is carried out by making use of an insert molding generally used, wherein a neck of a parison, which has been pre-injection molded, is held by a neck mold, the neck is inserted into a mold for molding a main parison portion to mold the main parison portion and at the same time, they are integrally connected to form a composite product.

In the case of this insert, pre-molded parison necks have to be continuously supplied one by one to neck molds, and holding of the parison necks by the neck molds always has to be carried out with accuracy.

However, it is extremely difficult to positively and continuously supply parison necks one by one to a plurality of neck molds, and it is more difficult to perform accurate holding of parison necks by neck molds. An insert device of high precision is required.

As a result of further repeated studies, the present inventor has found that it is advantageous in terms of manufacture as well as heat resisting bottles themselves to employ a process wherein a main parison portion provided with an outer layer of a parison neck and in inner layer of the parison neck is continuously molded within the same apparatus to thereby mold a composite parison in which the outer layer of the parison neck comprises the other heat-resisting synthetic resin, rather than a process wherein a pre-molded parison neck is inserted to mold a composite parison in which the neck comprises inner and outer (i.e., two) layers.

SUMMARY OF THE INVENTION

It is a primary object of this invention to provide a new injection molding method wherein only the outer layer of a parison neck is first injection molded, and a main parison portion is successively injection molded to thereby mold a composite parison in which only the parison neck is molded into the inner and outer two layers, without requiring further processing.

It is a further object of the invention to provide a new apparatus which can continuously injection mold an outer layer of a parison neck, a main parison portion and an inner layer of the neck integral with the main parison portion by movement of neck molds.

A method for injection molding a composite parison in accordance with the present invention to achieve the above-described objects comprises a first step wherein neck molds mounted on a transport plate and a molding mold for a parison neck or an outer layer of the neck are clamped at a first molding station and molten resin is injected into a cavity formed in the neck mold to mold the outer layer of the neck of the parison, and a second step wherein said outer layer of the neck together with the neck molds are transported to a second molding station, the neck molds, the mold for the main parison portion and core molds are clamped at said second molding station while holding the outer layer of the neck to form continuous cavities extending over the inside of the outer layer of the neck, and molten resin different from the first mentioned molten resin is injected into said cavity to mold the main parison and at the same time mold an inner layer of the neck which is integral with said main parison portion and deposited with the outer layer of the neck to form a composite.

While the resin used to mold said parison neck has different properties from that of the resin which forms the main parison portion, it will be noted that also in the case where the parison neck is formed of the same colored resin, such a resin is included as a different resin.

In the method of the present invention, molding of the outer layer of the parison neck is first carried out, the outer layer of the neck together with the neck molds are then transported to the molding station for the main parison portion, the main parison portion is molded beneath the parison neck with a different resin and at the same time, the inner layer of the neck is also molded to integrally deposit the inner and outer layers of the neck to form a composite parison. Therefore, in molding the composite parison, the outer layers of the parison necks need not be applied one by one by the apparatus. The invention further has an advantage in that different from the case of the insert, no deviation occurs when holding the outer layer of the neck, and the composition may be achieved always positively.

In addition, an injection molding apparatus in accordance with the present invention to achieve the above-described objects comprises a rotary transport plate provided beneath a base plate, a required number of neck molds at regular intervals mounted on the underside of said rotary transport plate, first and second stations wherein a molding mold for a parison neck or an outer layer of the neck and a mold for a main parison portion are respectively disposed at positions where two adjacent neck molds stop, vertically movable core molds disposed on the base plate of said two molding stations, a device for clamping said neck molds and said two molds at the underside of the base plate, a device for vertically moving a core associated with said clamping device, an injection device for molding the parison neck and an injection device for molding the main parison portion. Accordingly, it is merely necessary to dispose the mold for the outer layer of the neck and the mold for the main parison portion with respect to the adjacent neck molds. Therefore, this apparatus can be applied even to an injection, stretching and blow molding machine heretofore used. A parison having a neck formed into a composite can be subjected to injection molding exactly in the same manner as that of the case for a parison having a conventional construction.

BRIEF DESCRIPTION OF THE DRAWINGS

The drawings show one embodiment of a method and apparatus for injection molding a composite parison in accordance with the present invention.

PREFERRED EMBODIMENTS OF THE INVENTION

Figure 1:
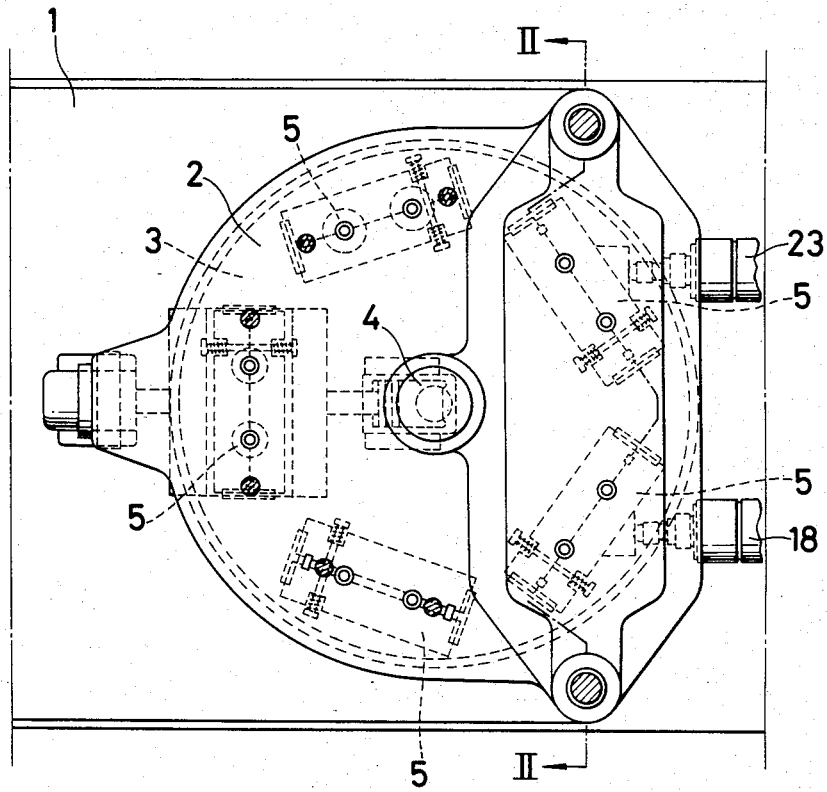
FIG. 1 is a plan view of an injection, stretching and blow molding machine.

Since the embodiment shown in the drawings is constructed referring to U.S. Pat. Nos. 4,105,391 and 4,321,029 previously developed by the present inventor, reference is made to these prior issued patents for the construction other than essential parts.

FIG. 1 shows a molding machine in which a circular rotary transport plate 3 is provided on the underside of a base plate 2 provided above a machine bed 1, and the rotary transport plate 3 is intermittently rotated through an angle of 72° by a drive device 4 positioned in the central portion of the base plate so as to effect injection molding of a parison, temperature control, stretching and blow molding, and release of hollow molded articles.

Figure 2:
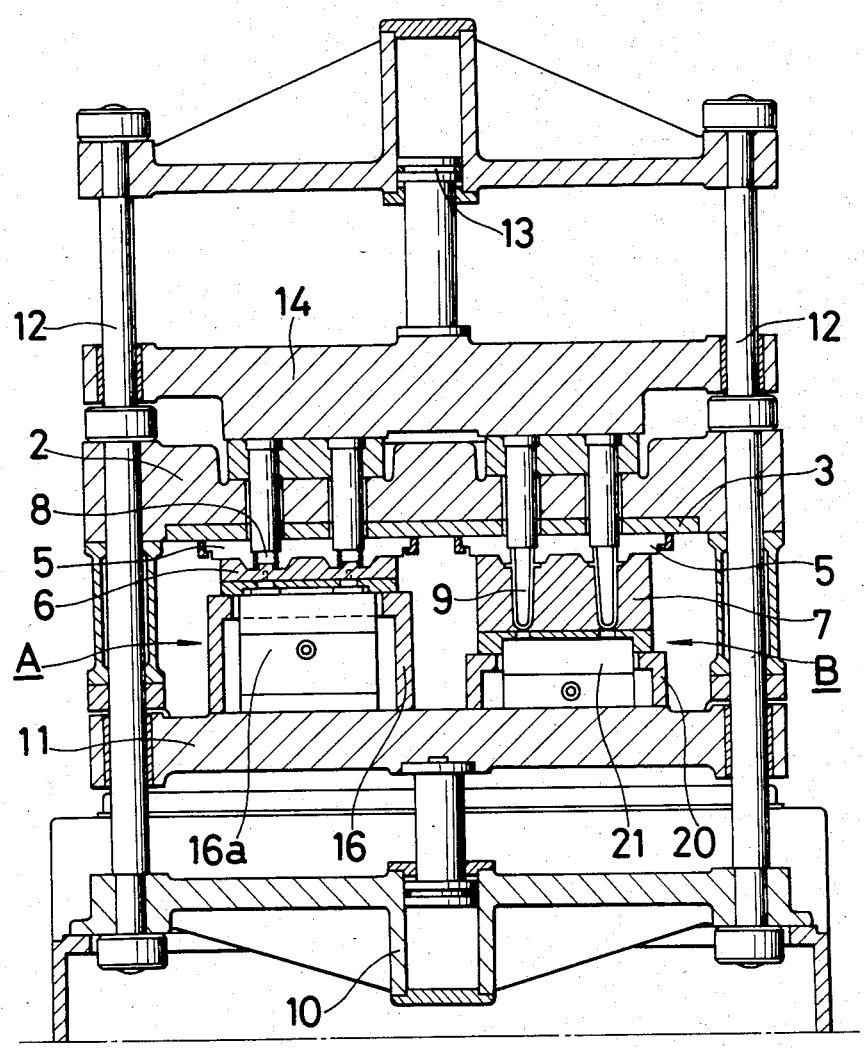
FIG. 2 is a sectional view taken along line II—II of FIG. 1.

FIG. 2 shows a parison injection molding apparatus for the aforesaid molding machine, in which the rotary transport plate 3 is provided close to the underside of the base plate 2, and a first molding station A and a second molding station B provided with a mold 6 for molding a lower portion of an outer layer in a parison neck (hereinafter referred to as an outer layer mold in the neck) and a parison mold 7 for simultaneously molding a barrel portion and a bottom portion, respectively, are provided in two adjacent neck molds 5, 5 beneath the rotary transport plate 3.

A core mold 8 inserted into the neck mold is vertically movably disposed on the base plate of the first molding station A, and a core mold 9 inserted into the main parison portion molding mold 7 extending through the neck mold 5 is vertically movably disposed on the base plate of the second molding station B.

The two aforesaid molds 6 and 7 are placed upon and secured to a clamping plate 11 of a clamping device 10 installed at the lower portion of the assembly, and the core molds 8 and 9 are mounted on a movable plate 14 of a hydraulic device 13 retained by tie bars 12 and 12 on opposite sides of the injection molding station which bars also serve to support the base plate 2.

Figure 3:
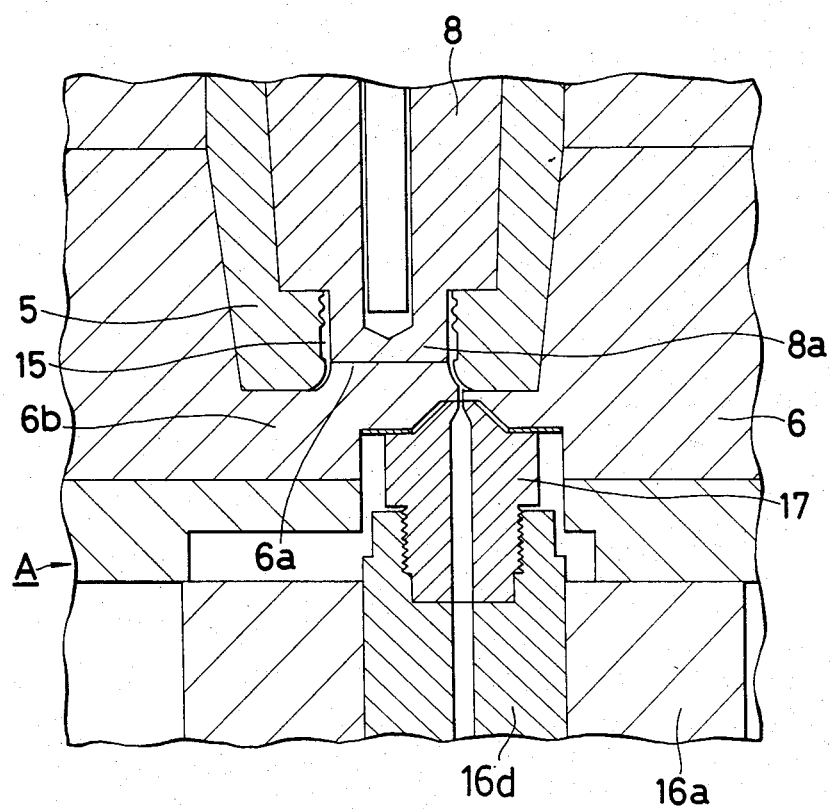
FIG. 3 is a longitudinal sectional view of a first molding station.
Figure 5:
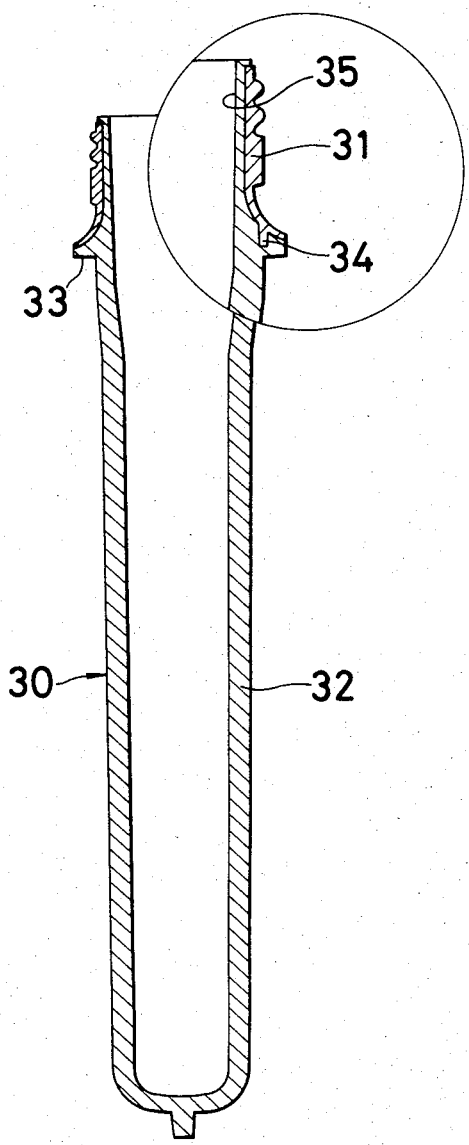
FIG. 5 is a partially enlarged longitudinal sectional view of a composite parison.

FIG. 3 is a view showing details of the aforesaid first molding station A which molds an outer layer 31 of a neck of a composite parison 30 shown in FIG. 5. A cavity 15 internally of the neck mold 5 is formed by the aforesaid outer layer mold 6 in the neck and the core mold 8. The outer layer mold 6 in the neck is provided with a portion 6b fitted in the outer periphery of the neck mold 5 and projecting portion 6a for molding the underside of the neck of the parison outwardly curved together with the neck mold 5, and a projected portion 8a formed at the lower end of the core mold 8 comes into contact with the projected portion 6a to form the cavity 15.

Reference numeral 16 of FIG. 2 designates a support frame secured to the clamping plate 11 for the parison neck mold 6, and internally of the support frame, a hot runner block 16d is attached onto the clamping plate. On the upper end of the hot runner block 16d is mounted a nozzle 17 in touch with a gate bored in the base of the projected portion 6a, and on the side thereof is provided a sprue gate with which an injection device 18 nozzle-touches, as shown in FIG. 1.

Figure 4:
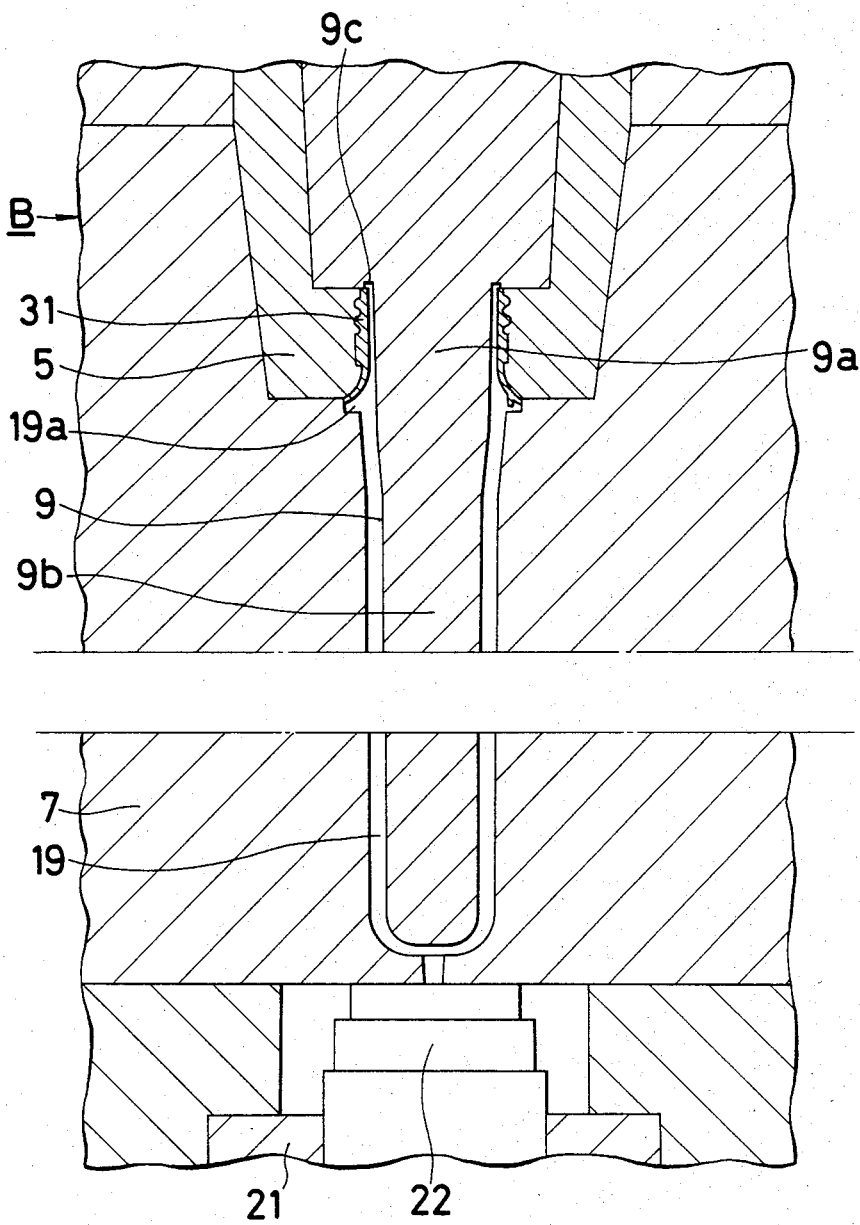
FIG. 4 is a longitudinal sectional view of a second molding station.

FIG. 4 is a view showing details of the aforesaid second molding station B which molds a main portion 32 of the composite parison 30 of FIG. 5. The main parison portion mold 7 has a cylindrical cavity 19 which defines a barrel portion and a bottom portion of the parison 30, and an upper opening thereof receives in the neck mold 5. As best seen in FIG. 2, internally of a frame body 20 on the clamping plate 11 for supporting the main parison portion mold 7, a hot runner block 21 is attached to the clamping plate 11, a nozzle 22 in nozzle touch with a gate bored in the bottom of the main parison portion mold 7 is provided on the upper end of the main parison portion mold 7, and on the side thereof is provided a sprue gate with which an injection device 23, shown in FIG. 1, nozzle-touches.

The aforesaid core mold 9 is provided with a base portion 9a for defining a cavity for the inner layer of the neck located between base portion 9a and the inner surface of the outer layer a neck 31, and a core portion 9b positioned in the central portion of the main parison mold 7, and a recessed groove 9c is formed between the base portion 9a and the core 9b, said recessed groove for covering an upper lip end edge of the outer layer of the neck 31 retained by the neck mold 5 with the same resin employed for molding the main parison portion 32. A peripheral portion of an opening of the cavity 19 is formed into a shoulder 19a which is positioned next to the lower end of the neck 31, and a flange 33 in the parison 30 of FIG. 5 is defined by said shoulder 19a.

Next, the case will be described in which the outer layer 31 of the parison neck of the composite parison 30 is molded of a different resin.

First, when the neck molds 5 and 5 stop at positions of the first molding station A and the second molding station B, the clamping device 10 and the hydraulic device 13 employed for vertical movement of the core are relatively actuated to effect clamping of the parison neck mold 6 and the main parison portion mold 7 and insertion of the core molds 8 and 9.

After completion of said clamping, the injection devices 18 and 23 are brought into nozzle touch with the hot runner blocks 16a and 21 disposed on the aforesaid two molds 6 and 7 to inject molten resin into the cavities 15 and 19. Polycarbonate is injected into the cavity 15 to mold the outer layer 31 of the parison neck having a projection 34 in the underside thereof.

Cooling of the molten resin is accomplished by passing a coolant through passages provided in mold portions 6 and 8; and 7 and 9 to cool the molds and thereby cool and set the molten resin. The coolant passages have been omitted from the figures for the sake of simplicity.

Polyethylene terephthalate is injected into the cavity 19 to mold the main parison portion 32 with an upper portion thereof having a flange 33. In this case, when the parison neck portion 31 previously molded is not present internally of the neck mold 5, a parison, in which a neck portion completely formed of polyethylene terephthalate, is molded. However, when the parison neck 31 molded by the previous molding operation is held by the neck mold 5 and thereby defines a portion of the cavity, the main parison portion 32 and the inner layer 35 of the composite parison neck are both molded and, at the same time, the inner layer 35 of the composite neck and the 31 forming the outer neck portion of the composite neck are integrally joined, the projection 34 being embedded into the flange 33 to serve as an anti-rotation element whereby a composite parison 30 formed of two kinds of resins is molded.

What is claimed is:

1. A method for injection molding a composite parison, comprising a first step wherein female neck molds mounted on a transport plate and male molds each cooperating with a female mold for forming a parison neck or an outer layer of the neck of a composite parison are brought together at a first molding station and molten resin is injected into a cavity formed by the cooperating male and female molds to mold the outer neck portion of the composite parison, and a second step wherein said outer layer of the neck is transported by the female neck molds to a second molding station, whereby the female neck molds and the female and male parison forming molds for forming the main parison portion are brought together at said second molding station to clamp the female neck forming portion holding the previously formed outer neck portion to form a continuous cavity including the interior surface of the outer neck portion, and molten resin different from the first mentioned molten resin is thereafter injected into said continuous cavity from a stationary source of resin to mold the main parison including an inner neck portion which is integral with said main parison portion and joined with the inner surface of the outer neck portion to form a composite parison.

2. A method according to claim 1 wherein a lower portion of said female neck mold is curved outwardly to define an outwardly curved portion at the lower end of the molded neck portion, and a projection in the form of a sprue is formed on the underside of said outwardly curved portion by injecting molten resin at the first molding station through a passageway defining said sprue and positioned next to the outwardly curved neck portion, and said projection extends downwardly into the cavity forming the parison and is embedded in the adjacent parison portion formed by said different molten resin injected at the second molding station to prevent movement of the outer layer of the neck in the circumferential direction relative to the parison.

3. A method for injection molding a composite parison utilizing neck mold assemblies and parison mold assemblies, said neck mold assemblies each comprised of upper and lower male neck mold portions and a female neck mold, said parison mold assemblies comprised of a lower parison mold and an upper core mold, said upper and lower male neck mold portions, and said lower parison and upper core molds each being mounted to reciprocate on a movable member, said method comprising the steps of moving the movable member to bring the upper neck mold and lower neck mold portions into alignment with an associated female neck mold and for bringing a lower parison mold and upper core mold into clamping alignment with an associated female neck mold;

bringing the aligned upper and lower male neck mold portions and female neck mold together to clamp said female neck mold and cooperatively form a neck mold cavity, and bringing the aligned lower core parison mold and upper core mold together to clamp the aligned female neck mold to form a composite parison and neck cavity;

introducing a molten resin of a first material into said neck mold assembly to mold a neck portion and introducing a molten resin of a different material into said parison mold assembly to mold a parison;

the female neck mold cooperating with the lower parison mold and upper core mold of the parison mold assembly to accurately position a molded neck portion molded in a neck mold assembly during a previous operation, so that the molten resin introduced into said parison mold assembly enters into the region of the parison cavity forming the parison neck and is joined with the inner surface of the molded neck member;

separating the upper and lower male neck mold portions and upper core mold and lower parison molds from the associated female neck molds and indexing the aforesaid female neck molds to bring the female neck molds into alignment with associated molds and mold portions of the neck mold and parison mold assemblies in readiness for the next molding operations.

4. The method of claim 3 further comprising the step of forming an integral projection in the form of a sprue along the inner surface of the molded neck member by injection of molten resin through a passageway communicating with the neck mold cavity during a neck molding operation, which projection becomes embedded in the molded parison material injected into the parison mold cavity to prevent circumferential rotation of the molded neck member relative to the molded parison joined thereto.

* * * * *

UNITED STATES PATENT AND TRADEMARK OFFICE
CERTIFICATE OF CORRECTION

PATENT NO. : 4,507,258

DATED : March 26, 1985

INVENTOR(S) : Katashi Aoki

It is certified that error appears in the above-identified patent and that said Letters Patent is hereby corrected as shown below:

On the title page;

In the Abstract, line 5 after the word "a" (1st occur.) insert --cooperating--.
Column 2, line 60 delete "of the case".
column 2, line 61 after "for" insert --molding--.
Column 4, delete lines 50 to 54 in their entirety and substitute the following paragraph: --The molded products 31 and 32 now in cavities 15 and 19 are next cooled to solidification, causing them to set in the molds as is well known in the art. As is well known, the cooled molded products, once set, may be transported without being dislodged. The cooled and set molded products 31 and 32 are thereafter transported to the parison casting station B by rotation of transport plate 3.
Column 4, line 67 after "the" (first occurence) insert --neck--.

Signed and Sealed this

Sixteenth Day of July 1985

[SEAL]

Attest:

DONALD J. QUIGG

Attesting Officer    Acting Commissioner of Patents and Trademarks